(12) United States Patent
Offenhaeuser et al.

(10) Patent No.: US 9,892,569 B2
(45) Date of Patent: Feb. 13, 2018

(54) DRIVER-ASSISTANCE SYSTEM FEATURING FATIGUE DETECTION, AND METHOD FOR PREDICTING A FATIGUE DEGREE

(71) Applicant: Robert Bosch GmbH, Stuttgart (DE)

(72) Inventors: Andreas Offenhaeuser, Marbach am Neckar (DE); Erik Lesser, Steinheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 14/814,827

(22) Filed: Jul. 31, 2015

(65) Prior Publication Data

US 2016/0049022 A1 Feb. 18, 2016

(30) Foreign Application Priority Data

Aug. 14, 2014 (DE) .................. 10 2014 216 201

(51) Int. Cl.
| | | |
|---|---|---|
| *G08B 23/00* | (2006.01) | |
| *G07C 5/08* | (2006.01) | |
| *B60W 40/08* | (2012.01) | |
| *B60W 50/00* | (2006.01) | |
| *B60K 28/06* | (2006.01) | |

(52) U.S. Cl.
CPC .......... *G07C 5/0808* (2013.01); *B60K 28/066* (2013.01); *B60W 40/08* (2013.01); *B60W 50/0097* (2013.01); *B60W 2040/0827* (2013.01); *B60W 2050/0052* (2013.01)

(58) Field of Classification Search
CPC ................ G07C 5/0808; B60W 40/08; B60W 2040/0827

USPC ........... 340/576, 573.1, 575, 854.3; 600/473, 600/486, 484, 508, 500, 595

See application file for complete search history.

(56) References Cited

U.S. PATENT DOCUMENTS

| | | | | |
|---|---|---|---|---|
| 5,337,743 | A * | 8/1994 | Repperger ............. | A62B 99/00 356/41 |
| 2007/0080816 | A1* | 4/2007 | Haque .................. | B60K 28/066 340/576 |
| 2011/0077548 | A1* | 3/2011 | Torch ..................... | A61B 3/112 600/558 |
| 2011/0313259 | A1* | 12/2011 | Hatakeyama ............ | A61B 5/18 600/300 |
| 2012/0265080 | A1* | 10/2012 | Yu ............................ | A61B 5/04 600/484 |

(Continued)

FOREIGN PATENT DOCUMENTS

WO  WO 2014017090 A1 * 1/2014 ........... A61B 5/6893

*Primary Examiner* — Dhaval Patel
(74) *Attorney, Agent, or Firm* — Norton Rose Fulbright US LLP; Gerard Messina

(57) ABSTRACT

A method for predicting an instant at which a predefined fatigue degree is expected to be reached in a vehicle system for fatigue detection, includes: (i) detecting the fatigue characteristic by continuously ascertaining the current fatigue degree of the vehicle operator; (ii) ascertaining a change in the fatigue degree over time within a predefinable time interval of the fatigue characteristic, and/or supplying an empirically determined change in fatigue degree over time; and (iii) ascertaining the instant at which a predefined fatigue degree is expected to be reached, based on the ascertained and/or supplied change in the fatigue degree.

17 Claims, 1 Drawing Sheet

(56) References Cited

U.S. PATENT DOCUMENTS

2012/0296226 A1* 11/2012 Su .................... A61B 5/024
                                                        600/508
2015/0164400 A1* 6/2015 Shimizu ............ A61B 5/6893
                                                        600/485

* cited by examiner

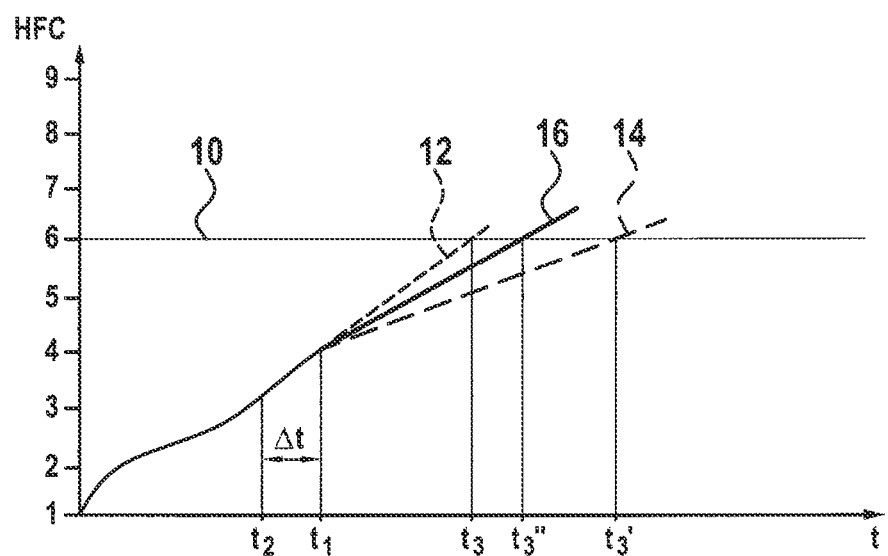

DRIVER-ASSISTANCE SYSTEM FEATURING FATIGUE DETECTION, AND METHOD FOR PREDICTING A FATIGUE DEGREE

RELATED APPLICATION INFORMATION

The present application claims priority to and the benefit of German patent application no. 10 2014 216 201.7, which was filed in Germany on Aug. 14, 2014, the disclosure of which is incorporated herein by reference.

FIELD OF THE INVENTION

The present invention relates to a method for predicting an instant at which a predefined fatigue degree will most likely be reached in a vehicle system for fatigue detection. In addition, the present invention relates to a driver assistance system having a processing unit for carrying out the method.

BACKGROUND INFORMATION

Fatigue in road traffic is one of the main causes of accidents. Driver assistance systems (DAS) offer the opportunity of automatically detecting driver fatigue and of warning the driver in case of an unfitness to drive.

For this purpose driver assistance systems include a fatigue detection system. The latter is defined here as a system located within the vehicle, which monitors the driver behavior and is activated if the driver appears to be impaired due to fatigue. The main objective is to prevent a micro sleep event while operating a car.

Scaling methods based on monitoring make it possible to allocate the fatigue of the vehicle driver to a specific fatigue degree. The use of standardized scales ensures the most objective fatigue estimate possible. Two of the most common scales were established by Wierwille and Ellsworth (abbreviated: Wierwille scale) and with Human Factors Consult GmbH Berlin (abbreviated: HFC scale). The Wierville scale includes four stages of driver fatigue, which range from 1=not fatigued, to 4=extremely fatigued. Each stage is characterized by specific eye parameters and behavior indicators. The HFC scale includes nine stages of fatigue, which range from 1=awake to 9=sleep. Nine indicators are used for classifying a driver state. Another scaling possibility is offered by the TU-Berlin drowsiness scale (abbreviated: TUBS scale).

Previous systems for fatigue detection now use prediction algorithms to calculate the fatigue degree on the basis of sensor data. Such a sensor-based fatigue detection in real time may take into account the available driving performance parameters (steering motions, speed, lane keeping) or characteristic data of the vehicle driver, such as the eye movement or blinking behavior, the head position and head movement, the heart rate or similar biophysical parameters.

However, the customer using the driver assistance systems currently on the market finds it difficult to notice or actually experience detected fatigue. The reason for this is that the fatigue detection invariably becomes noticeable only after a predefined fatigue degree has been reached. This may be due to the circumstance that the conventional fatigue detection systems supply only a value for the current fatigue state of the driver.

SUMMARY OF THE INVENTION

One disadvantage, or multiple disadvantages, of the related art can be remedied or at least reduced with the aid of the method for predicting an instant at which a predefined fatigue degree will most likely be reached in a vehicle system for fatigue detection according to the present invention. The method according to the present invention includes the following steps:
 (i) Detecting the fatigue characteristic by continuously ascertaining the current fatigue degree of the vehicle operator;
 (ii) Ascertaining a change in the fatigue degree over time within a predefinable time interval of the fatigue characteristic and/or supplying an empirically ascertained change in fatigue degree over time; and
 (iii) Ascertaining the instant at which a predefined fatigue degree will most likely be reached, based on the ascertained and/or supplied change in the fatigue degree.

The present invention makes it possible to predict an instant at which the fatigue degree has reached a particular predefined value in an uncomplicated and robust manner. The current fatigue degree serves as starting point. On the one hand, a gradient of the fatigue degree (change in the fatigue degree over time) within a predefined time interval may be ascertained for this purpose. The time interval, for example, may be set in such a way that the fatigue characteristic during the past ten minutes is monitored continuously. In addition or as an alternative, it is also possible to utilize an empirically determined value for the change in the fatigue degree over time. The empirically ascertained fatigue change over time may amount to 0.5 to 1.5 fatigue degrees per hour, in particular 1 fatigue degree, according to the HFC scale.

According to one variant, the ascertaining of the fatigue change in step (ii) takes place in such a way that the fatigue characteristic within the predefined time interval is filtered independently of each other via two PT1 elements having different time constants. The difference between the two filtered fatigue characteristics is subsequently used for ascertaining the change in the fatigue degree. This makes it possible to supply the change in the fatigue degree in an especially uncomplicated manner and in real time for the further steps of the method.

In step (iii) of the method, the instant is calculated at which the fatigue degree reaches a predefined threshold, based on the current fatigue degree of the vehicle operator and the ascertained and/or the empirically determined change in the fatigue degree. This predefined fatigue degree may lie in the range from 5 to 7, in particular at 6, of the HFC scale.

One essential aspect of the present invention therefore is the provision of an algorithm which estimates on the basis of the history of the fatigue characteristic the time that the driver is still able to drive the car until the driver—maintaining the current driving style—becomes fatigued and must rest. The instant generated in the system may then be displayed to the driver in order to inform him, for example, or it may be taken into account in some other manner in the driver assistance system or also a navigation system.

According to one further variant of the method of the present invention, an average value is formed from the change in the fatigue degree ascertained in step (ii) and the provided change in fatigue degree. This makes it possible to further improve the prediction of the change in fatigue degree based on the current fatigue degree.

One further aspect of the present invention lies in the provision of a vehicle assistance system having a processing unit. This system and the processing unit are set up for implementing the afore-described method.

Additional specific embodiments of the present invention can be gathered from the following description and the further descriptions herein.

The present invention is explained in greater detail below on the basis of exemplary embodiments and an associated drawing.

BRIEF DESCRIPTION OF THE DRAWING

The FIGURE shows a fatigue characteristic according to the HFC scale over time.

DETAILED DESCRIPTION

In the following text, a method is described for predicting an instant at which a predefined fatigue degree is expected to have been reached in a vehicle system for fatigue detection.

From FIG. 1, a real characteristic of the fatigue degree over time leading up to an instant t1 can be gathered. The fatigue degree has been measured according to the HFC scale, and this value is ascertained and made available with the aid of known fatigue detection systems on the basis of sensor data in the vehicle. In addition, a threshold value 10 for the fatigue degree is stored in the fatigue detection system, which is value 6 of the HFC scale in this instance. Once this value has been reached, a warning signal is usually output via the fatigue detector.

The present method now supplies a prognosis for an instant $t_3$ at which the fatigue degree is expected to reach threshold value 10.

According to a first variant, the fatigue characteristic within a specific time interval is analyzed at a random instant $t_1$ following a certain minimum driving period. Time interval $\Delta t$ shown in FIG. 1, for example, is delimited by instants $t_1$ and $t_2=t_1-10$ min. Using the linear function, it is then possible to calculate the gradient from the fatigue degrees at instants $t_1$ and $t_2$. As soon as the gradient is known, and assuming that the gradient of the fatigue degree remains approximately constant, an extrapolation to an instant $t_3$, at which the fatigue degree reaches threshold 10 (in FIG. 1, intersection of the upper dashed straight line 12 calculated from the gradient, and threshold value 10), can finally be made. With knowledge of instant $t_3$, a time until the warning (time to drowsiness) can then be ascertained and possibly communicated to the vehicle driver.

According to one further variant, it is possible to calculate the warning instant, i.e., the point at which threshold value 10 is reached, also with the aid of a gradient stored in the system. When the HFC scale is used, for example, the calculation may be undertaken under the assumption that the HFC value increases by the value of 1 for every hour of driving time. Accordingly, starting from instant $t_1$, it is possible to ascertain an instant $t_3$, at which threshold 10 is expected to be reached (see intersection of the lower dashed straight line 14 calculated on the basis of the stored gradient, and threshold value 10). The gradient stored in the system may be ascertained empirically ahead of time.

The two variants described above are combinable, in particular in such a way that an average value is formed (see FIG. 1, solid straight line 16) and supplies a correspondingly corrected instant $t_3$.

In one particular implementation of the variant, in which the gradient of the fatigue degree is ascertained directly from the detected fatigue characteristic, two PT1 elements having different time constants are provided as filter elements. The resulting difference between the filtered fatigue characteristics downstream from the two PT1 elements is used for ascertaining the gradient of the fatigue degree.

What is claimed is:

1. A method for predicting an instant at which a predefined fatigue degree of a vehicle operator is expected to be reached, the method comprising:
    detecting a fatigue characteristic by ascertaining a current fatigue degree of the vehicle operator over time;
    ascertaining a fatigue degree gradient based on an average of a change in the current fatigue degree over time within a predefined time interval of the fatigue characteristic and an empirical change in fatigue degree over time; and
    ascertaining the instant at which the predefined fatigue degree is expected to be reached based on the current fatigue degree and the ascertained fatigue degree gradient.

2. A method for predicting an instant at which a predefined fatigue degree of a vehicle operator is expected to be reached, the method comprising:
    detecting a fatigue characteristic by ascertaining a current fatigue degree of the vehicle operator over time;
    ascertaining a fatigue degree gradient by ascertaining a change in the current fatigue degree over time within a predefined time interval of the fatigue characteristic, wherein ascertaining the fatigue degree gradient includes independently filtering the fatigue characteristic over the predefined time interval using two different filter elements having different time constants, and forming the fatigue degree gradient as a function of a difference between the two filtered fatigue characteristics; and
    ascertaining the instant at which the predefined fatigue degree is expected to be reached based on the current fatigue degree and the ascertained fatigue degree gradient.

3. The method of claim 1, wherein the predefined fatigue degree lies in a range from 5 to 7 of the Human Factors Consult (HFC) scale.

4. The method of claim 1, wherein the empirically determined change in fatigue degree over time amounts to 0.5 to 1.5 fatigue degrees per hour according to the Human Factors Consult (HFC) scale.

5. The method of claim 1, wherein the predefined fatigue degree lies at 6 on the Human Factors Consult (HFC) scale.

6. A driver assistance system, comprising:
    a processor configured for predicting an instant at which a predefined fatigue degree of a vehicle operator is expected be reached, by performing the following:
        determining a fatigue characteristic including a current fatigue degree of the vehicle operator over time;
        ascertaining a fatigue degree gradient based on an average of a change in the current fatigue degree over time within a predefined time interval of the fatigue characteristic and an empirical change in fatigue degree over time; and
        ascertaining the instant at which the predefined fatigue degree is expected to be reached based on the current fatigue degree and the ascertained fatigue degree gradient.

7. A driver assistance system, comprising:
    a processor configured for predicting an instant at which a predefined fatigue degree of a vehicle operator is expected be reached, by performing the following:
        determining a fatigue characteristic including a current fatigue degree of the vehicle operator over time;

ascertaining a fatigue degree gradient by ascertaining a change in the current fatigue degree over time within a predefined time interval of the fatigue characteristic, wherein ascertaining the fatigue degree gradient includes independently filtering the fatigue characteristic over the predefined time interval using two different filter elements having different time constants, and forming the fatigue degree gradient as a function of a difference between the two filtered fatigue characteristics; and ascertaining the instant at which the predefined fatigue degree is expected to be reached based on the current fatigue degree and the ascertained fatigue degree gradient.

8. The driver assistance system of claim 6, wherein the processing unit is further configured to display to the vehicle operator an indication of the ascertained instant at which the predefined fatigue degree is expected to be reached.

9. The driver assistance system of claim 6, wherein the current fatigue degree is ascertained using a fatigue detection system based on sensor data of the vehicle.

10. The driver assistance system of claim 6, wherein ascertaining the instant at which the predefined fatigue degree is expected to be reached includes extrapolating the detected fatigue characteristic using the ascertained fatigue degree gradient.

11. The method of claim 1, further comprising displaying to the vehicle operator an indication of the ascertained instant at which the predefined fatigue degree is expected to be reached.

12. The method of claim 1, wherein the current fatigue degree is ascertained according to the Human Factors Consult scale.

13. The method of claim 1, wherein the current fatigue degree is ascertained using a fatigue detection system based on sensor data of the vehicle.

14. The method of claim 1, wherein ascertaining the instant at which the predefined fatigue degree is expected to be reached includes extrapolating the detected fatigue characteristic using the ascertained fatigue degree gradient.

15. The method of claim 1, wherein ascertaining the empirical change in fatigue degree over time includes retrieving the empirical change in fatigue degree over time from a data storage device of the vehicle.

16. A non-transitory machine-readable storage medium having program instructions, which when executed by a processor perform a method for predicting an instant at which a predefined fatigue degree of a vehicle operator is expected to be reached, the method comprising:

detecting a fatigue characteristic by ascertaining a current fatigue degree of the vehicle operator over time;

ascertaining a fatigue degree gradient based on an average of a change in the current fatigue degree over time within a predefined time interval of the fatigue characteristic and an empirical change in fatigue degree over time; and ascertaining the instant at which the predefined fatigue degree is expected to be reached based on the current fatigue degree and the ascertained fatigue degree gradient.

17. A non-transitory machine-readable storage medium having program instructions, which when executed by a processor perform a method for predicting an instant at which a predefined fatigue degree of a vehicle operator is expected to be reached, the method comprising:

detecting a fatigue characteristic by ascertaining a current fatigue degree of the vehicle operator over time;

ascertaining a fatigue degree gradient by ascertaining a change in the current fatigue degree over time within a predefined time interval of the fatigue characteristic, wherein ascertaining the fatigue degree gradient includes independently filtering the fatigue characteristic in the predefined time interval using two filter elements having different time constants, and forming the fatigue degree gradient as a function of a difference between the two filtered fatigue characteristics; and ascertaining the instant at which the predefined fatigue degree is expected to be reached based on the current fatigue degree and the ascertained fatigue degree gradient.

* * * * *